(12) United States Patent
Godsted

(10) Patent No.: US 6,241,445 B1
(45) Date of Patent: Jun. 5, 2001

(54) ASYMMETRIC BEVEL CORRUGATED FASTENER

(75) Inventor: Kent B. Godsted, Grayslake, IL (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 09/540,387

(22) Filed: Jun. 19, 2000

(51) Int. Cl.[7] ............................................. F16B 15/00
(52) U.S. Cl. ........................ 411/478; 411/464; 411/499; 411/912
(58) Field of Search ................................. 411/464, 477, 411/478, 499, 912

(56) References Cited

U.S. PATENT DOCUMENTS

| | | |
|---|---|---|
| 461,154 | 10/1891 | Welteroth . |
| 1,182,201 | 5/1916 | Norton . |
| 1,321,092 | 11/1919 | Danner . |
| 1,328,911 | 1/1920 | Cary . |
| 1,959,360 | 5/1934 | Heyser . |
| 2,046,339 | 7/1936 | McChesney . |
| 2,122,814 | 7/1938 | Hansen . |
| 2,156,682 | 5/1939 | Dimoush . |
| 2,377,169 | 5/1945 | Mohr . |
| 2,918,705 | 12/1959 | Pearce . |
| 3,507,384 | 4/1970 | Lippitt . |
| 3,553,794 | 1/1971 | Kneidl et al. . |
| 3,618,446 | 11/1971 | Black . |
| 3,722,671 | 3/1973 | Wright et al. . |
| 3,762,541 | 10/1973 | Hinden et al. . |
| 4,058,047 | 11/1977 | Kramer et al. . |
| 4,221,153 | 9/1980 | Medina . |
| 4,514,126 | 4/1985 | Knowles . |
| 4,681,498 | 7/1987 | Raffoni . |
| 5,193,959 | 3/1993 | Motta . |
| 5,333,979 | 8/1994 | Raffoni . |

OTHER PUBLICATIONS

ITW Paslode, "Corrugated Fastening System Model No. MA–C20 & C20N" brochure, 2pgs., Mar. 1992.

*Primary Examiner*—Neill Wilson
(74) *Attorney, Agent, or Firm*—Lisa M. Seltis; Mark W. Croll; John P. O'Brien

(57) ABSTRACT

A corrugated fastener having an asymmetrically corrugated body member with more corrugations protruding from one face of the body member than from an opposite face thereof, and a leading edge on one end of the body member, the leading edge formed by at least one beveled surface and skewed toward the face of the body member having more corrugations protruding therefrom.

21 Claims, 2 Drawing Sheets

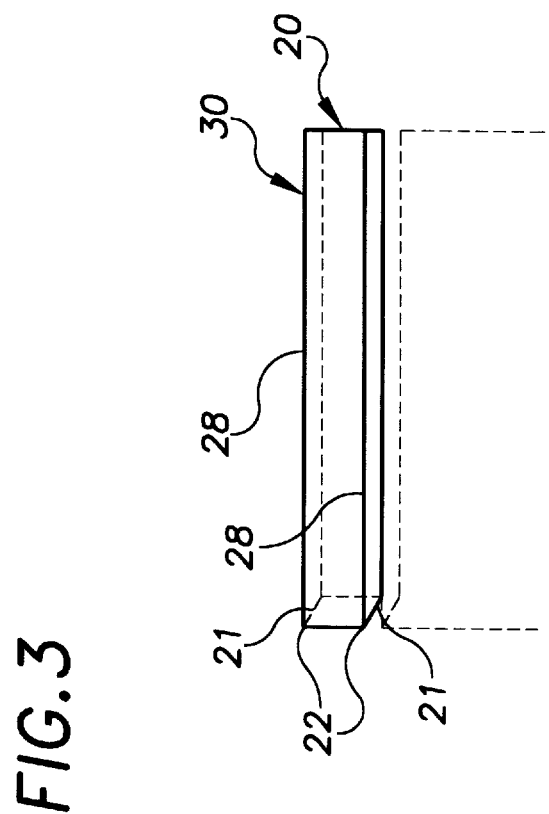
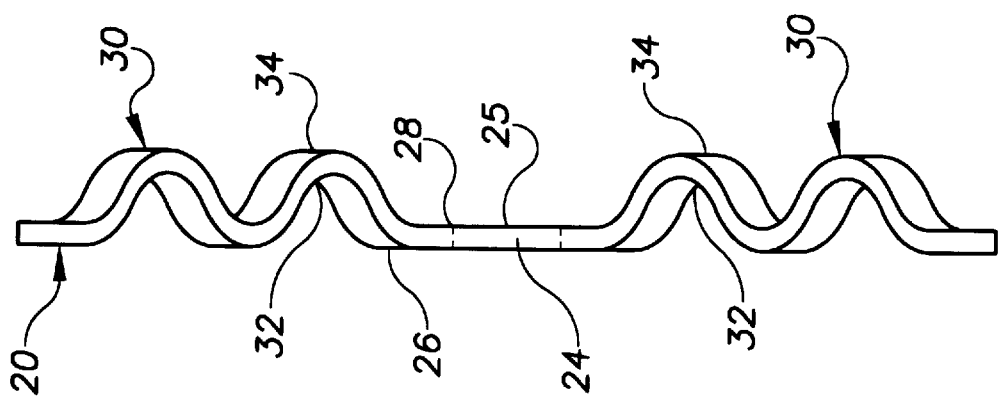

ASYMMETRIC BEVEL CORRUGATED FASTENER

BACKGROUND OF THE INVENTION

The invention relates generally to corrugated fasteners, and more particularly to asymmetric corrugated fasteners.

Corrugated staples or fasteners are known generally and used widely in applications involving miter and butt joints, for example in the manufacture of picture and cabinet frames, pallets and truss assemblies, among many other applications.

Known corrugated fasteners and fastening tools therefor include the corrugated fastening systems, Model Nos. MA-C20 and MA-C20N, by ITW Paslode, Vernon Hills, Ill. The corrugated fasteners by ITW Paslode are collated and joined together by polyethelene filaments for loading into the fastening tool.

In some corrugated fasteners, the corrugations protrude asymmetrically from opposite faces thereof or the corrugations protrude from only one face thereof, as disclosed for example in U.S. Pat. No. 4,514,126 entitled "Corrugated Staple". The referenced corrugated fasteners by ITW Paslode are also asymmetric.

Corrugated fasteners generally include a leading edge configured to facilitate penetration of the fastener into a workpiece during installation. The corrugated fasteners by ITW Paslode for example have a symmetrically formed leading edge defined by two converging beveled surfaces. The asymmetric corrugated staples of U.S. Pat. No. 4,514,126, however, have an asymmetric leading edge formed by a single bevel disposed on the same face of the staple having the corrugations protruding therefrom.

An object of the present invention is to provide novel corrugated fasteners that overcome problems in and improve upon the prior art.

Another object of the invention is to provide novel corrugated fasteners that are reliable and economical.

A further object of the invention is to provide novel corrugated fasteners having a reduced tendency to penetrate into work pieces at an angle.

A further object of the invention is to provide novel corrugated fasteners that compensate for an adverse tendency of prior art fasteners to penetrate into work pieces at an angle during installation. This adverse tendency of prior art fasteners results generally from some asymmetry thereof.

Still another object of the invention is to provide novel corrugated fasteners that reduce wear and tear on fastening tools therefor.

A more particular object of the invention is to provide novel corrugated fasteners comprising a generally planar body member having a plurality of ribs protruding from only one face thereof, and a leading edge on the body member having a single beveled surface disposed on another face of the body member opposite the face thereof from which the ribs protrude.

Another more particular object of the invention is to provide novel corrugated fasteners comprising an asymmetrically corrugated body member having more corrugations protruding from one face of the body member than from an opposite face thereof, and a leading edge on one end of the body member, the leading edge skewed toward the face of the body member having more corrugations protruding therefrom.

Yet another more particular object of the invention is to provide novel corrugated fasteners comprising a corrugated body member having more corrugations protruding from one face of the body member than from an opposite face thereof, and a leading edge on the body member formed at least partly by a predominant bevel on the face of the body member opposite the face thereof having more corrugations.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 2 is a trailing end view of an exemplary asymmetric corrugated fastener.

FIG. 3 is a side view of an exemplary corrugated fastener.

DETAILED DESCRIPTION OF THE INVENTION

Figure 1:
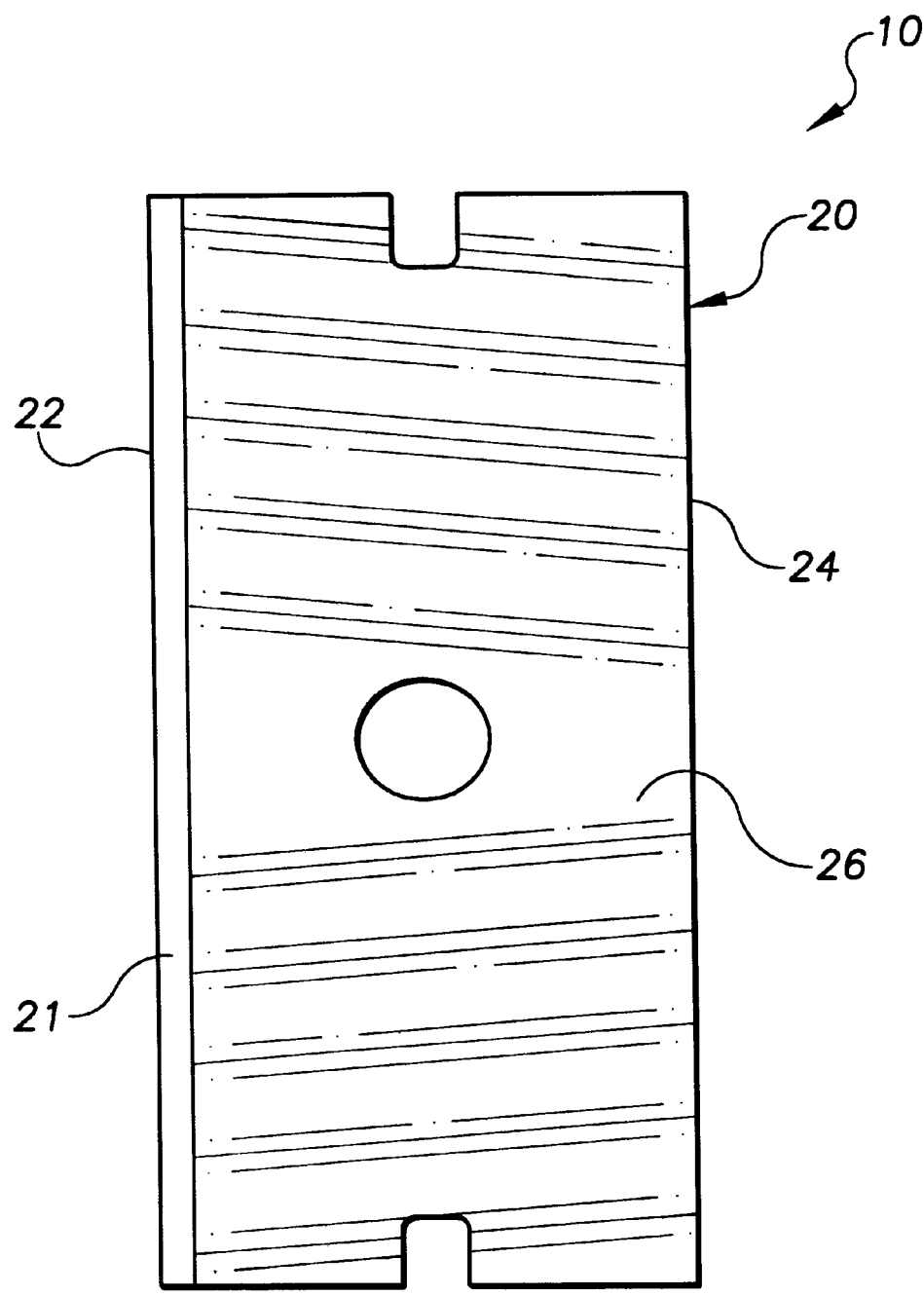
FIG. 1 is a facial view of an exemplary asymmetric corrugated fastener.

In FIG. 1, a corrugated fastener 10 comprises a generally planar body member 20 having a leading edge 22 and a trailing end 24. In FIG. 2, the body member 20 has opposite faces 26 and 28, only one of which, face 26, is shown in FIG. 1. The body member 20 in the exemplary embodiment has a generally flat rectangular planar shape, but alternative embodiments may have other geometrical shapes including non-flat configurations, for example the generally planar body member may be slightly curved.

The body member 20 is asymmetrically corrugated, and in the exemplary embodiment of FIG. 2 the body member includes a plurality of undulating ribs 30, not all of which are identified in the drawing, protruding from only one face 28 thereof. The ribs are generally characterized by corresponding troughs 32 and ridges 34, only some of which are identified, on corresponding opposite faces of the body member.

The asymmetrically corrugated body member 20 may have, more generally, corrugations protruding from both faces thereof. In the present application, corrugated fasteners having more corrugations protruding from one face of the corresponding body member than from the opposite face thereof are considered to have asymmetric corrugated body members.

During installation, asymmetrically corrugated body members, including the exemplary corrugated body member 20, have a tendency to penetrate the work piece at an angle other than 90 degrees, despite being orientated initially at a right angle relative to the surface thereof prior to installation. The tendency of the fastener to penetrate the work piece at an angle during installation, other than its initial angle, results generally from some asymmetry thereof. In the exemplary embodiments, the asymmetry results from the asymmetry of the corrugations, and more particularly to the existence of more corrugations or ribs protruding from one face of the body member than from the opposite face thereof.

FIGS. 1 and 2 illustrate the corrugations extending generally between the leading edge 22 of the body member and the trailing end 24 thereof. In the exemplary embodiment, the corrugations converge toward the trailing end of the body member.

FIG. 2 illustrates the corrugations or ribs 30 arranged symmetrically on opposite lateral side portions of the body member, and an intermediate portion 25 of the body member devoid of corrugations. In other embodiments, there may be additional corrugations and/or the corrugations may have different orientations and locations on the body member.

The leading edge 22 is formed generally by or between first and second surfaces converging from opposite faces of the body member. The leading edge is preferably skewed toward the face of the body member having the corrugations or ribs protruding therefrom. In other words, the leading edge is generally located more closely to the face of the body member having the most corrugations protruding therefrom, than it is to the opposite face thereof having fewer or no corrugations.

In the side view of the exemplary embodiment of FIG. 3, the leading edge 22 of the body member 20 is skewed toward the face 28 thereof having the corrugations or ribs 30 protruding therefrom. In this exemplary embodiment, the leading edge 22 is formed by the convergence of the face 28 of the body member 20 from which the ribs 30 protrude and a single beveled surface 21 formed on the opposite face of the body member. In the exemplary embodiment, the leading edge 22 follows the contour of the corrugations.

In alternative embodiments, the leading edge 22 may be formed by two asymmetrically converging bevels extending from corresponding opposite faces of the body member, wherein the leading edge is skewed toward the face of the body member having the more ribs or corrugations protruding therefrom by a predominant bevel, which extends more toward the opposite face of the body member than does the less predominant bevel.

The skewed location, or asymmetry, of the leading edge compensates for the tendency of the asymmetrically corrugated fastener to penetrate the work piece at an angle during installation other than its initial angle prior to installation. The asymmetric corrugated fastener thus tends to better maintain is original orientation relative to the surface of the work piece as it penetrates therein by virtue of the asymmetric leading edge, which compensates for the tendency of the fastener to penetrate at an angle.

The asymmetry of the leading edge, and more particularly location thereof and the angle or angles of the corresponding beveled surfaces, is dictated largely by the extent to which the asymmetry of the leading edge must compensate for the asymmetry of the corrugated body member. Generally, the more asymmetric the corrugated body member, the more asymmetric must be the leading edge. The angle or angles of the leading edge may also be dictated to some extent by the nature and properties of the work piece into which the fastener is installed. Based on the forgoing disclosure, those of ordinary skill may readily determine the extent of the asymmetry and the angles of the one or more beveled surfaces forming the leading edge without undue experimentation.

The corrugated body member is formed generally of a metal in some forming operation known to those of ordinary skill in the art. The leading edge 22 and particularly the one or more beveled surfaces thereof may be formed by known manufacturing processes, including for example grinding or skiving operations.

In FIG. 3, the asymmetrically corrugated fastener is one of a plurality of corrugated fasteners collated or joined together in a strip and retained by frangible means as is known to those of ordinary skill in the art, whereby the strip is useable in a fastener installation tool.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A corrugated fastener comprising:
   a body member having opposite faces;
   a plurality of ribs protruding from only one face of the body member;
   a leading edge on the body member having a single beveled surface disposed on the face of the body member opposite from the face thereof having the ribs protruding therefrom, wherein each rib has an arcuate profile as viewed from the leading edge.

2. The corrugated fastener of claim 1, the leading edge formed by the convergence of the single beveled surface and the face of the body member from which the ribs protrude.

3. The corrugated fastener of claim 1, the body member has a trailing end, the ribs extend generally between the leading and trailing ends of the body member.

4. The corrugated fastener of claim 3, the ribs converge toward the trailing end of the body member.

5. The corrugated fastener of claim 1, the ribs are arranged symmetrically on opposite lateral sides of the body member.

6. The corrugated fastener of claim 1 is metal.

7. The corrugated fastener of claim 1 is one of a plurality of corrugated fasteners joined together in a strip, whereby the strip is useable in a fastener installation tool.

8. A corrugated fastener comprising:
   an asymmetrically corrugated body member having more corrugations protruding from one face of the body member than from an opposite face thereof;
   a leading edge on an end of the body member opposite a trailing end thereof,
   the leading edge skewed toward the face of the body member having more corrugations protruding therefrom.

9. The corrugated fastener of claim 8, the leading edge formed by first and second surfaces converging from the opposite faces of the body member.

10. The corrugated fastener of claim 9, the first surface is the face of the body member from which the corrugations protrude and the second surface is a beveled surface on the opposite face of the body member.

11. The corrugated fastener of claim 10, the corrugations extend generally between the leading edge and trailing end of the body member.

12. The corrugated fastener of claim 11, the corrugations converge toward the trailing end of the body member.

13. The corrugated fastener of claim 12, the corrugations are arranged symmetrically on lateral side portions of the body member.

14. The corrugated fastener of claim 13 is a generally flat rectangular member.

15. A corrugated fastener comprising:
   a corrugated body member having more corrugations protruding from one face of the body member than from an opposite face thereof;
   a leading edge on the body member formed at least partly by a predominant bevel on the face of the body member opposite the face thereof having more corrugations protruding therefrom.

16. The corrugated fastener of claim 15, the leading edge formed by the face of the body member from which the corrugations protrude and the predominant bevel.

17. The corrugated fastener of claim 15, the body member has a trailing end, the corrugations extend generally between the leading edge and trailing end of the body member.

18. The corrugated fastener of claim 17, the corrugations converge toward the trailing end of the body member.

19. The corrugated fastener of claim 17, the corrugations are arranged symmetrically on opposite lateral sides of the body member, an intermediate portion of the body member devoid of corrugations.

20. The corrugated fastener of claim 19 is a generally flat rectangular metal member.

21. A corrugated fastener comprising:

a body member having opposite faces;

at least three ribs protruding from only one face of the body member;

a leading edge on the body member having a single beveled surface disposed on the face of the body member opposite from the face thereof having the ribs protruding therefrom.

* * * * *